United States Patent
Nagashima

(10) Patent No.: US 7,730,255 B2
(45) Date of Patent: Jun. 1, 2010

(54) APPARATUS, METHOD, AND PROGRAM FOR RECORDING

(75) Inventor: Hideki Nagashima, Tokyo (JP)

(73) Assignee: Sony Corporation (JP)

(*) Notice: Subject to any disclaimer, the term of this patent is extended or adjusted under 35 U.S.C. 154(b) by 478 days.

(21) Appl. No.: 11/789,449

(22) Filed: Apr. 24, 2007

(65) Prior Publication Data
US 2007/0286060 A1    Dec. 13, 2007

(30) Foreign Application Priority Data
Apr. 25, 2006    (JP) .................... P2006-120986

(51) Int. Cl.
*G06F 12/00* (2006.01)
*G06F 13/00* (2006.01)
*G06F 13/28* (2006.01)

(52) U.S. Cl. .................................... 711/112
(58) Field of Classification Search .................. 711/112
See application file for complete search history.

(56) References Cited

U.S. PATENT DOCUMENTS

| 7,161,883 B2 | 1/2007 | Shiozawa et al. | |
| 2005/0088936 A1* | 4/2005 | Shiozawa et al. | 369/47.28 |
| 2005/0141377 A1* | 6/2005 | Yamanaka | 369/47.53 |
| 2007/0076554 A1* | 4/2007 | Sasaki | 369/53.24 |
| 2007/0081795 A1* | 4/2007 | Katata et al. | 386/125 |
| 2007/0121459 A1* | 5/2007 | Hirayama et al. | 369/53.34 |
| 2007/0286060 A1* | 12/2007 | Nagashima | 369/275.3 |
| 2008/0198732 A1* | 8/2008 | Maeda et al. | 369/275.3 |

FOREIGN PATENT DOCUMENTS

| JP | 2004-062947 A | 2/2004 |
| JP | 2004-288230 A | 10/2004 |
| JP | 2006-040328 A | 2/2006 |

* cited by examiner

*Primary Examiner*—Sheng-Jen Tsai
(74) *Attorney, Agent, or Firm*—Lerner, David, Littenberg, Krumholz & Mentlik, LLP

(57) ABSTRACT

A recording apparatus for recording data in individual blocks each made of plural given regions on an optical disc is disclosed. The recording apparatus may have (i) a detection portion which detects a finally recorded region on the disc by detecting for each of the given regions as to whether or not data is recorded and (ii) a recording control portion which records dummy data from a region next to the finally recorded region detected by the detection portion to the final region of a block located behind the finally recorded region by at least one region and then starting to record data from the head region of the subsequent block.

7 Claims, 17 Drawing Sheets

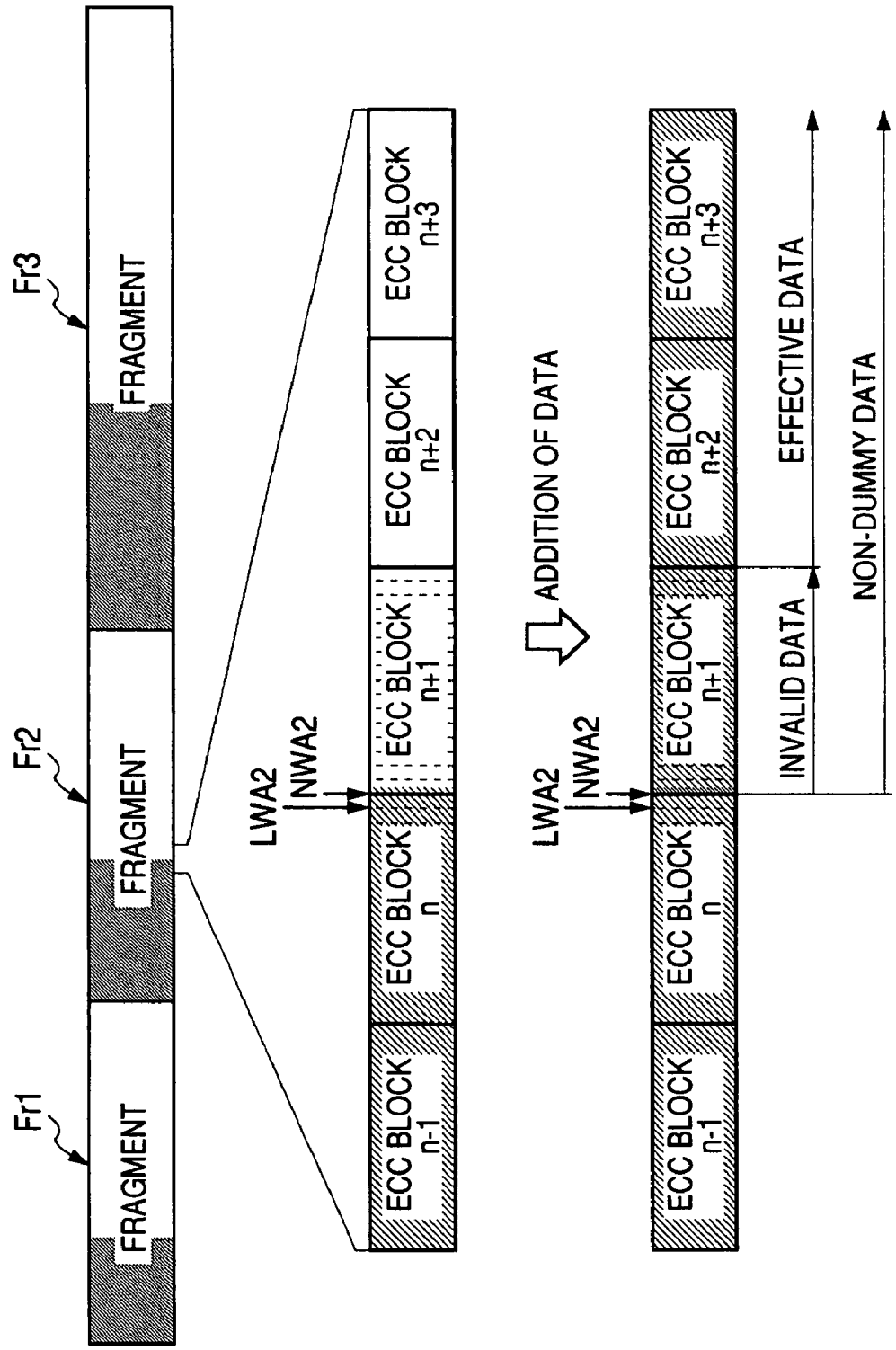

APPARATUS, METHOD, AND PROGRAM FOR RECORDING

CROSS-REFERENCE TO RELATED APPLICATIONS

This application claims priority from Japanese Patent Application No. JP 2006-120986 filed in the Japanese Patent Office on Apr. 25, 2006, the entire content of which is incorporated herein by reference.

BACKGROUND OF THE INVENTION

1. Field of the Invention

The invention relates to apparatus, method, and program for recording and, more particularly, to techniques suitably applied, for example, to a disc camcorder using an optical disc as a recording medium.

2. Description of the Related Art

As one known type of disc camcorder, there is a disc camcorder using a DVD+R (Digital Versatile Disc+Recordable) as a recording medium. The DVD+R does not permit rewriting of data but enables multisession recording. In this type of disc camcorder, the recording region of an optical disc is divided into one or more sessions. Each session is divided into plural regions, known as fragments. In each fragment, data is recorded in ECC blocks each including plural sectors (e.g., 16 sectors from sector 0 to sector 15).

Therefore, when data is recorded in each fragment in multiple sessions, the finally recorded address (i.e., the address of the final sector in the final ECC block where data is recorded) in the immediately previous recording operation is detected. An address next to the finally recorded address is taken as a recording start address. In this case, addresses are in units of sectors. Data is recorded in ECC blocks from the recording start address. In the following description, the number of session is set to 1. In this case, closing the session is the same meaning as finalizing.

This method of recording is described in detail regarding the management data structure for the DVD+R, processing for making preparations for recording to be performed before data is recorded on the DVD+R, and a procedure to be performed to record data on the DVD+R in practice. These structure, processing, and procedure are described separately. First, the management data structure for the DVD+R on which data will be recorded is described. As shown in FIG. 10, the DVD+R has an ADIP (address in pre-groove) and a main area providing recording areas for various kinds of data. In the ADIP, PFI (physical format information) including information indicating the disc type (i.e., DVD+R), the finally recordable address, and information necessary during recording has been previously recorded.

Of these regions, the main area is composed of (i) an inner drive area that is a disc management area, (ii) a lead-in zone added to the head of the session, and (iii) a data zone in which image data acquired by an imaging technique is recorded. These area and zones are arranged in this order from the inner side of the DVD+R. Of these zones, the inner drive area is composed of (i) an initial zone in which data is not recorded at all, (ii) a disc test zone used as a tentative writing region for OPC (optimum power control), (iii) a disc count zone that is a region indicating the state in which the disc test zone is used, and (iv) a TOC zone in which TOC (table of contents) information is recorded.

The lead-in zone of the main area includes a disc ID (IDentification) zone and a control data zone. Of these zones, SDCB (session disc control blocks) information indicating the start address and end address of the session declared to be used from the host side (i.e., the control system of the disc camcorder) is recorded in the disc ID zone. PFI information created based on information obtained from ADIP when finalizing is done to permit an ordinary DVD player to play the DVD+R is recorded in the control data zone.

As shown in FIG. 11, the data zone of the main area is divided into plural fragments Fr. In each fragment Fr, data is recorded in successive ECC blocks each including 16 sectors. In the example of FIG. 11, the data zone is divided into three fragments, i.e., Fr1, Fr2, and Fr3.

As an example, it is assumed that the optical disc is not yet finalized and that the fragments Fr of sessions declared to be used from the host side are fragments Fr1 and Fr2. It follows that the start and end addresses of the fragment Fr1 and the start and end addresses of the fragment Fr2 are recorded in the SDCB information. The region located behind the final fragment Fr2 shown in the SDCB information is separately managed as the final fragment Fr3 on the side of the drive. As such, the disc camcorder can use the final fragment Fr3 not shown in the SDCB information as a data recorded region. Incidentally, if the disc is finalized in this state, the start and end addresses of the final fragment Fr3 are also recorded in the SDCB information.

The processing for making preparations for recording to be performed before data is recorded on the optical disc by the disc camcorder when the disc is inserted into the camcorder is next described. This processing for making preparations for recording is performed by the control portion of the disc camcorder. It is assumed that the inserted optical disc is a DVD+R having the aforementioned data management structure. As illustrated in the flowchart of FIG. 12, the control portion of the disc camcorder first goes to step SP1 when processing RT1 for making preparations for recording is started. In the step SP1, if insertion of the optical disc is recognized, the control portion proceeds to the next step SP2.

In step SP2, the control portion identifies the type of the inserted optical disc. In this case, the control portion determines that the type is the DVD+R and goes to the next step SP3. In step SP3, the control portion obtains PFI information from the inserted DVD+R. In this case, the control portion first attempts to read the PFI information from the control data zone of the DVD+R. If the attempt fails, the control portion attempts to read the PFI information from the ADIP and derives the PFI information. If the attempt to derive the PFI information fails, this procedure RT1 of processing for making preparations for recording is terminated with error. If the attempt to acquire the PFI information succeeds, the control portion checks the results of the identification in the previous step 2 based on the type of the disc contained in the PFI information, and then goes to the next step SP4.

In step SP4, the control portion adjusts the servo of the optical pickup. After the adjustment, the control portion obtains TOC information from the TOC zone of the optical disc and acquires disc ID information and SDCB information from the disc ID zone in the subsequent steps SP5-SP6. Then, the control portion goes to the next step SP7.

In step SP7, the control portion executes the processing for obtaining the finally recorded address as a subroutine, the processing being typically needed to record additional data. A procedure of processing for obtaining the finally recorded address is described by referring to the flowchart of FIG. 13, the processing being executed in this step SP7. The control portion first proceeds to step SP10 if the procedure RT2 of processing for obtaining the finally recorded address is started. In the step SP10, the control portion makes a decision as to whether the inserted optical disc has been finalized.

If the decision at the step SP10 is negative (No), it means that the final fragment Fr (e.g., fragment Fr3) is present behind the fragments Fr (e.g., fragments Fr1 and Fr2) shown in the SDCB information. At this time, the control portion goes to step SP11. In this step SP11, the control portion identifies the final fragment Fr3. That is, the control portion takes the address next to the final address of the rearmost fragment Fr2 recorded in the SDCB information as the start address of the final fragment Fr3 (in this case, addresses are represented in sectors). Also, the control portion identifies the final fragment Fr3 while taking the finally recordable address obtained from the PFI information as an end address. The control portion proceeds to the next step SP12.

Meanwhile, if the decision at step SP10 is affirmative (Yes), it means that the start and end addresses of all the fragments Fr including the final fragment Fr3 are recorded in the SDCB information because the inserted optical disc has been finalized. At this time, the control portion determines that it is not necessary to identify the final fragment Fr3. The control portion then goes to step SP12.

In step SP12, the control portion detects the rearmost address at which an RF (radio-frequency) signal is recorded as the finally recorded address LWA of each fragment Fr as shown in FIG. 14 by detecting the presence or absence of the RF signal between the start address and end address in each sector for all the fragments Fr. Then, the control portion goes to the next step SP13. At this time, the control portion detects the presence or absence of the RF signal using a sector synchronization signal.

In step SP13, the control portion makes a decision as to whether the finally recorded address LWA has been normally detected from each fragment Fr in the previous step SP12. If the decision at the step SP13 is negative, it means that error occurs in detecting the finally recorded address LWA. In this case, the control portion terminates the procedure RT2 of processing for obtaining the finally recorded address with error. On the other hand, if the decision at the step SP13 is affirmative, the control portion determines that the finally recorded address LWA has been normally detected from each fragment Fr. Then, control portion proceeds to step SP14.

In step SP14, the control portion makes a decision for each fragment Fr as to whether the finally recorded address LWA is the end address of the fragment Fr. If the decision at the step SP14 is negative, it means that there is a region on which more data can be recorded in the fragment Fr. At this time, the control portion goes to step SP15. As illustrated in FIG. 14, the recording start address NWA is set as an address next to the finally recorded address LWA. On the other hand, if the decision at the step SP 14 is affirmative, it means that the finally recorded address LWA of the fragment Fr is the end address, i.e., no further data can be recorded in the fragment Fr. At this time, the control portion sets the recording start address NWA at 0, which does not exist as an address. This means that additional data cannot be recorded in the fragment Fr. After the recording start address NWA is set for each fragment Fr in this way, the control portion ends the procedure RT2 of processing for obtaining the finally recorded address.

After the processing for obtaining the finally recorded address is executed in the step SP7 in this way, the control portion goes to the next step SP8 (FIG. 12). In this step SP8, the control portion searches for a disc test zone (DIT) used as a tentatively written region during OPC. The optical pickup is made to be on standby at that location. The procedure RT1 of processing for making preparations for recording is ended.

Preparations for starting recording of data on the inserted DVD+R are completed by executing the processing for making preparations for recording as described above.

When data is recorded on the DVD+R in practice, the control portion of the disc camcorder starts recording of data from the recording start address NWA obtained by the above-described processing for making preparations for recording. That is, when data is recorded, for example, in the fragment Fr2, data is recorded in each ECC block from the recording start address NWA2 (in this case, the address of the head sector of the (n+1)th ECC block) as shown in FIG. 14.

In this type of disc camcorder, it is stipulated that data be recorded in ECC blocks in succession as described previously and so when recording of data is ended at an intermediate point of an ECC block because of power failure occurring, for example, during data recording, data is not recorded in successive ECC blocks. Subsequently, data cannot be appended in multiple sessions.

Accordingly, a method of recording as shown in FIG. 15 has been heretofore proposed (see, for example, JP-A-2004-62947 (patent document 1) ). In particular, when data is appended, for example, to fragment Fr2 in multiple sessions, if the detected finally recorded address LWA2 in the latest session does not indicate the final sector (sector 15) in the ECC block, i.e., the finally recorded address LWA2 in the previous session indicates an intermediate sector (sector 0 to sector 14) of the ECC block, it is determined that the previous data recording was terminated at an intermediate point of the ECC block (in this case, (n+1)th ECC block). Dummy data is added to this ECC block, making an amendment. That is, data is recorded in ECC blocks. Data (hereinafter referred to as the non-dummy data to be discriminated from dummy data) can be again appended in multiple sessions from the ECC block next to that ECC block. The dummy data cannot be read out during reading.

SUMMARY OF THE INVENTION

However, in the aforementioned method of recording, the disc camcorder detects whether or not an RF signal is present in each sector, using a sector synchronization signal. Therefore, this detection can be performed only at an accuracy of about 1 sector. For this reason, where the RF signal is interrupted at an intermediate point of the head sector (sector 0) of the (n+1)th ECC block of the fragment Fr2, for example, as shown in FIG. 16, there is the danger that the disc camcorder cannot detect the RF signal recorded in this head sector. As a result, there is the possibility that the address of the final sector (sector 15) of the nth ECC block immediately preceding the head sector is erroneously detected as the finally recorded address LWA2; correctly, the address of the head sector should be detected as the finally recorded address LWA2.

Where the finally recorded address LWA2 is erroneously detected in practice as described previously, the detected finally recorded address LWA2 is the final sector of the nth ECC block in spite of the fact that previous operation of data recording was abnormally terminated at an intermediate point in the head sector of the (n+1)th ECC block as shown in FIG. 17. Therefore, the disc camcorder determines that the previous operation of data recording has been normally terminated in units of ECC blocks. Recording of non-dummy data will be started from the address of the head sector of the (n+1)th ECC block without appending dummy data.

As a result, in the head sector of the (n+1)th ECC block, the present non-dummy data is made to overwrite the non-dummy data recorded at the time when abnormal termination occurred the previous time. In the case of a non-rewritable optical disc such as DVD+R, the doubly written non-dummy data in the head sector cannot be read out. Consequently, there is the possibility that the non-dummy data recorded in the (n+1)th ECC block containing the head sector is in an uncorrectable state, i.e., the data become invalid data that cannot be read out during reading.

In this way, with the related-art method of recording, there is the problem that recorded non-dummy data might not be read out during reading.

In view of the foregoing, it may be desirable to provide apparatus, method, and program for recording data in such a way that the data can be reliably read out during reading.

One embodiment of the invention which solves the foregoing problem may provide a recording apparatus for recording data in individual blocks each made of plural given regions on an optical disc. The recording apparatus may have (i) a detection portion which detects a finally recorded region on the optical disc by detecting for each of the given regions as to whether or not data is recorded and (ii) a recording control portion which records dummy data from a region next to the finally recorded region detected by the detection portion to a final region of a block located behind the finally recorded region by at least one region and then starting to record data from a head region of a subsequent block.

Therefore, even in a case where an error of about 1 region occurs in detecting the finally recorded region, dummy data may be recorded from the region next to the finally recorded region to the final region of a block located behind the finally recorded region by at least one region. Data may be started to be recorded from the head region of the subsequent block. Consequently, double writing of data can be prevented while strictly maintaining the principle of block-by-block recording of data.

According to one embodiment of the invention, when data is recorded in blocks each having plural given regions on an optical disc, each of the given regions may be detected as to whether or not there is recorded data. Consequently, the finally recorded region on the optical disc may be detected. Dummy data may be recorded from the region next to the detected finally recorded region to the final region of a block located behind the finally recorded region by at least one region. Non-dummy data may be started to be recorded from the head region of the next block. Therefore, even in a case where an error of about 1 region occurs in detecting the finally recorded region, dummy data may be recorded from the region next to the finally recorded region to the final region of the block located behind the finally recorded region by at least one region. Then, non-dummy data may be started to be recorded from the head region of the subsequent block. In consequence, double writing of data can be prevented while strictly maintaining the principle of block-by-block recording of data. Hence, apparatus, method, and program capable of recording data in such a way that the data can be reliably read out during reading can be accomplished.

BRIEF DESCRIPTION OF THE DRAWINGS

FIG. 17 is a schematic diagram used for illustration of double writing of non-dummy data that can occur when a finally recorded address is erroneously detected.

DETAILED DESCRIPTION

Embodiments of the invention are hereinafter described in detail with reference to the drawings.

(1) Whole Structure of Disc Camcorder

Figure 1:
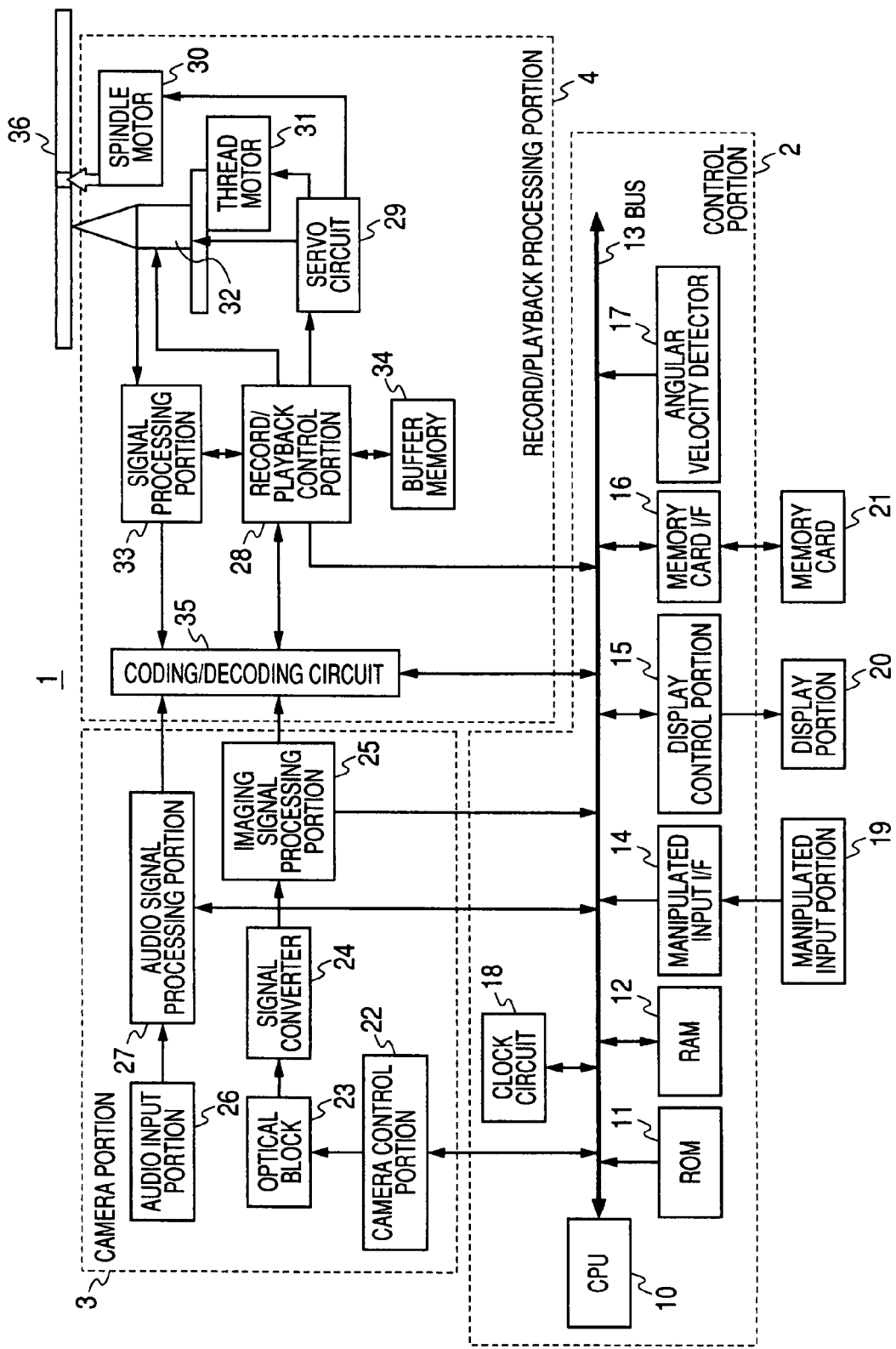
FIG. 1 is a block diagram showing the whole structure of a disc camcorder.

Referring to FIG. 1, the whole structure of the disc camcorder is indicated by reference numeral 1. The camcorder has a control portion 2, a camera portion 3, and a record/playback processing portion 4. In this disc camcorder 1, a CPU (central processing unit) 10 of the control portion 2 controls all of various portions of the control portion 2, camera portion 3, and record/playback processing portion 4 which are connected via a bus 13 and performs various kinds of processing by expanding various programs on a RAM (random access memory) 12 and executing the programs. The various programs are read from a ROM (read only memory) 11.

In the control portion 2, the ROM 11, the RAM 12, a manipulated input interface 14, a display control portion 15, a memory card interface 16, an angular velocity detector 17, and a clock circuit 18 are connected with the CPU 10 via the bus 13. The angular velocity detector 17 is made of a gyroscope or the like. A manipulated input portion 19 including various manipulated keys is connected with the input interface 14 of those components. A display portion 20 made of an LCD (liquid crystal display) or the like is connected with the display control portion 15. A memory card 21 can be inserted into the memory card interface 16.

Meanwhile, the camera portion 3 includes a camera control portion 22, an optical block 23, a signal converter portion 24, an imaging signal processing portion 25, an audio input portion 26, and an audio signal processing portion 27. The optical block 23 includes lenses for imaging a subject, an aperture adjusting mechanism, a focus adjusting mechanism, a zoom mechanism, a shutter mechanism, a flash mechanism, and an anti-jitter stabilization (image stabilization). The signal converter portion 24 is made of a CCD (charge-coupled device) or the like. The record/playback processing portion 4 includes a record/playback control portion 28, a servo circuit 29, a spindle motor 30, a thread motor 31, an optical pickup 32, a signal processing portion 33, a buffer memory 34, and a coding/decoding circuit 35.

When a manipulation for starting imaging processing, for example, or a manipulation for starting playback processing is performed via the manipulated input portion 19 while an optical disc 36 is inserted in a disc insertion portion (not shown) in the disc camcorder 1, if an input signal corresponding to such a manipulation is supplied to the CPU 10 of the control portion 2 via the manipulated input interface 14, the CPU creates a control signal in response to the input signal and sends the control signal to all of the control portion 2, camera portion 3, and record/playback processing portion 4.

The camera control portion 22 of the camera portion 3 controls the optical block 23 by sending a command signal responsive to the control signal supplied from the CPU 10 of the control portion 2 to the optical block 23, and accepts imaging light rays.

The imaging light rays accepted by the optical block 23 are converted into an imaging signal by the signal converter 24 and sent to the imaging signal processing portion 25. The imaging signal processing portion 25 performs given kinds of processing (e.g., gamma correction, AGC (auto gain control), and analog-to-digital conversion) on the supplied imaging signal and thus creates an imaging picture signal indicating imaging picture data. The picture signal is sent to the CPU 10 of the control portion 2 and to the coding/decoding circuit 35 of the record/playback processing portion 4.

At this time, the audio input portion 26 of the camera portion 3 collects sound from around the disc camcorder 1, converts the sound into an audio signal, and sends the audio signal to the audio signal processing portion 27. The audio signal processing portion 27 performs given kinds of processing (e.g., various kinds of correction, AGC, and analog-to-digital conversion) on the audio signal based on the control signal from the control portion 2, thus creating a digital audio signal indicative of audio data. The digital audio signal is sent to the coding/decoding circuit 35 of the record/playback processing portion 4.

The record/playback control portion 28 of the record/playback processing portion 4 sends command signals responsive to a control signal supplied from the CPU 10 of the control portion 2 to various portions of the record/playback processing portion 4, thus controlling the various portions. In this way, recording and playback to and from the optical disc 36 are done.

In practice, when the imaging picture signal and digital audio signal are supplied from the camera portion 3, the coding/decoding circuit 35 of the record/playback processing portion 4 encodes and modulates the signals to thereby create an EFM+ (eight to fourteen modulation plus) signal and sends the created signal to the record/playback control portion 28. The control portion 28 temporarily stores the EFM+ signal in the buffer memory 34 and controls the optical pickup 32 to execute processing for recording on the optical disc 36.

That is, the record/playback control portion 28 rotates the spindle motor 30 via the servo circuit 29 to rotationally drive the optical disc 36 placed on a turntable (not shown). The pickup 32 directs laser light at the recording layer of the optical disc 36 under control of the control portion 28 and converts the laser light reflected from the recording layer of the disc 36 into a photoelectric signal. Thus, the photoelectric signal corresponding to the amount of the reflected light is created and sent to the signal processing portion 33.

The signal processing portion 33 creates a tracking error signal and a focus error signal for controlling the optical pickup 32 in response to the photoelectric signal supplied from the optical pickup 32 and sends the created signals to the record/playback control portion 28.

The record/playback control portion 28 controls the optical pickup 32 via the servo circuit 29 and drives the thread motor 31 in response to the tracking error signal, moving the pickup 32 in the direction of tracking. In addition, the control portion 28 drives an objective lens driver (not shown) of the optical pickup 32 in the tracking direction, focus direction, and tilt direction in response to the tracking error signal and the focus error signal, thus moving the objective lens to its optimum position.

The record/playback control portion 28 performs processing for playback by controlling various portions of the record/playback processing portion 4 in the same way as in such processing for recording.

In particular, the signal processing portion 33 creates a playback signal based on the photoelectric signal supplied from the optical pickup 32 under control of the record/playback control portion 28 and sends the playback signal to the coding/decoding circuit 35, which in turn decodes the playback signal into a playback image signal composed of image data and sends the signal to the CPU 10.

When the imaging picture signal and playback image signal are supplied from the camera portion 3 and record/playback processing portion 4, respectively, the CPU 10 displays a picture and a playback image based on the imaging picture signal and the playback image signal, respectively, on the display portion 20 via the display control portion 15.

In this way, the disc camcorder 1 is made to record the imaging picture data obtained as a result of imaging performed by the camera portion 3 and audio data obtained as a result of collecting sound onto the optical disc 36 under control of the CPU 10. The disc camcorder also reads the data (e.g., image data) recorded on the optical disc 36.

Furthermore, the CPU 10 records the image data supplied from the record/playback processing portion 4 onto the memory card 21 via the memory card interface 16 and, at the same time, reads out the image data recorded on the memory card 21 via the memory card interface 16 and supplies the image data to the record/playback processing portion 4.

Additionally, the angular velocity detector 28 of the control portion 2 is designed to create information indicating the angular velocity applied from the outside to the disc camcorder 1. The clock circuit 29 is designed to create time information indicating year, month, date, hour, minute, and second.

(2) Recording Procedure Performed by the Disc Camcorder

Recording procedures performed by the disc camcorder 1 constructed as described above in recording data on the inserted optical disc 36 are next described. These procedures include a procedure of processing for making preparations for recording to be executed before data is recorded on the optical disc 36 and a procedure of processing for starting recording to be executed when recording of data on the disc 36 is started in practice. These procedures are described separately in detail.

Figure 10:
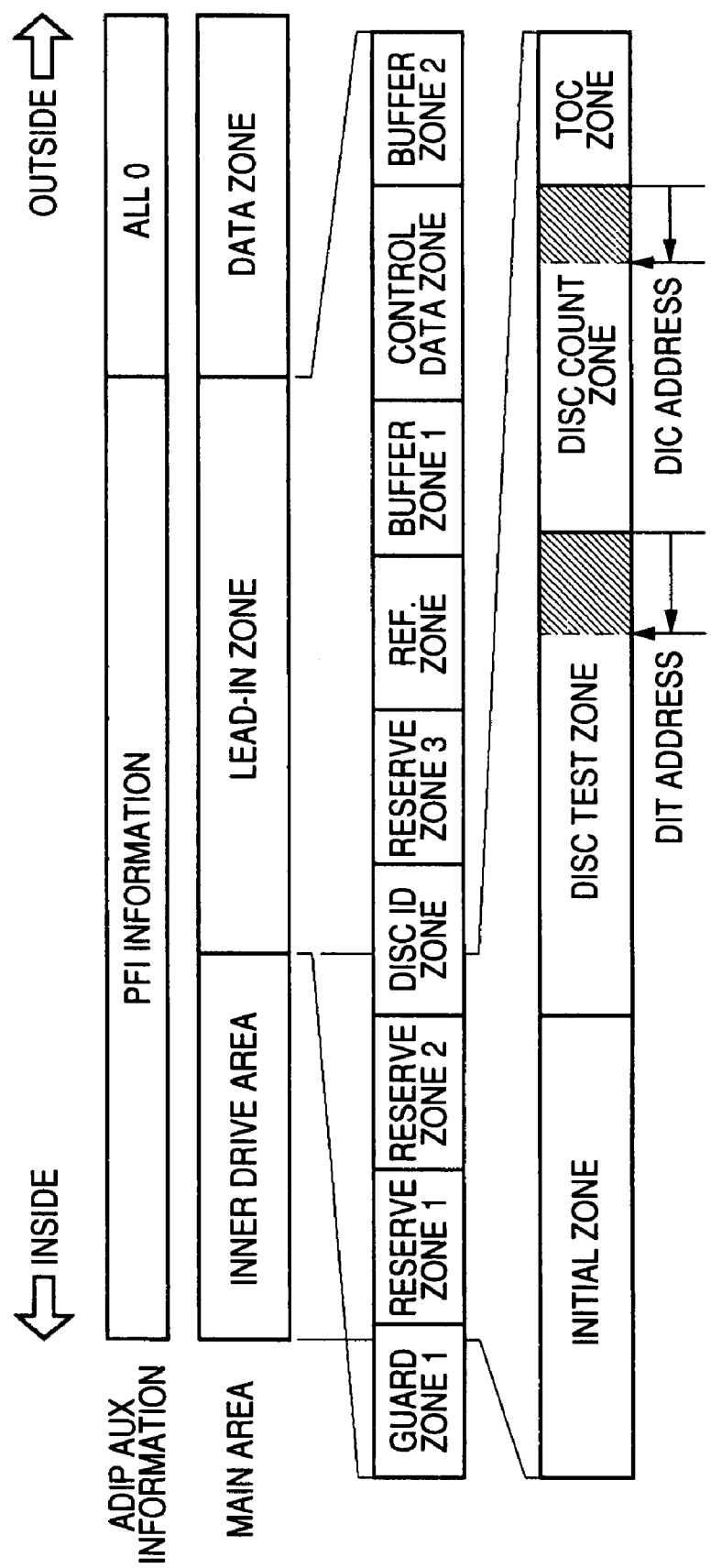
FIG. 10 is a schematic diagram used for illustration of management data structure (1) of DVD+R.
Figure 11:
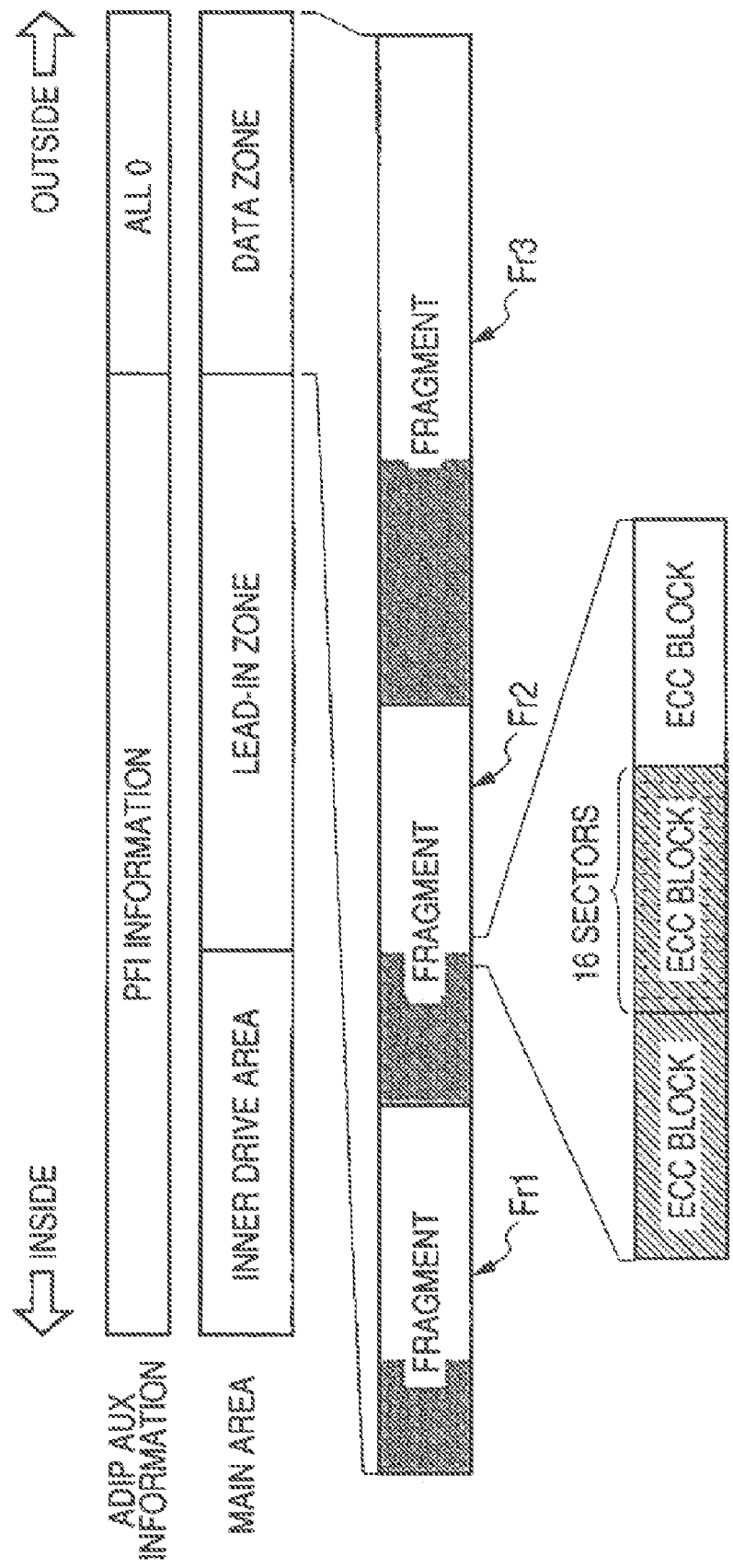
FIG. 11 is a schematic diagram used for illustration of management data structure (2) of DVD+R.
Figure 12:
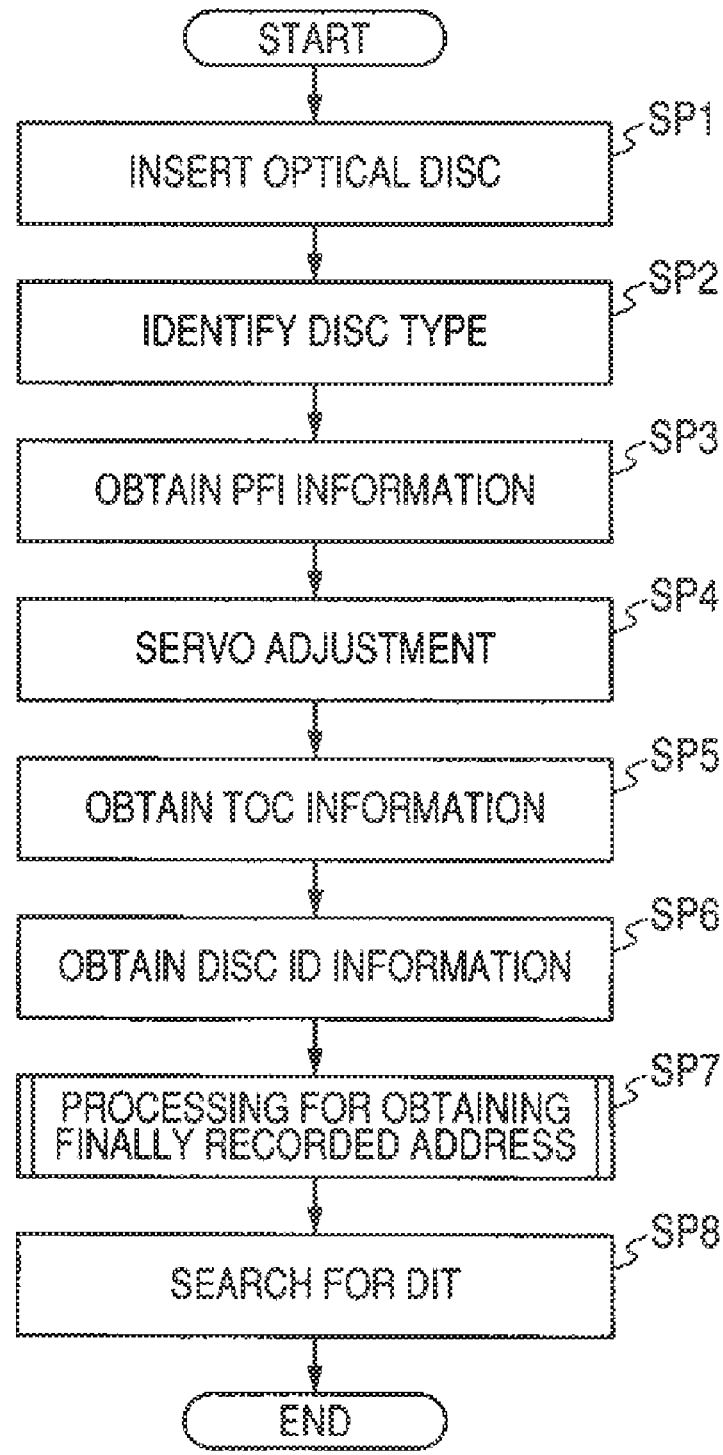
FIG. 12 is a flowchart illustrating a related-art procedure of processing for making preparations for recording.
Figure 13:
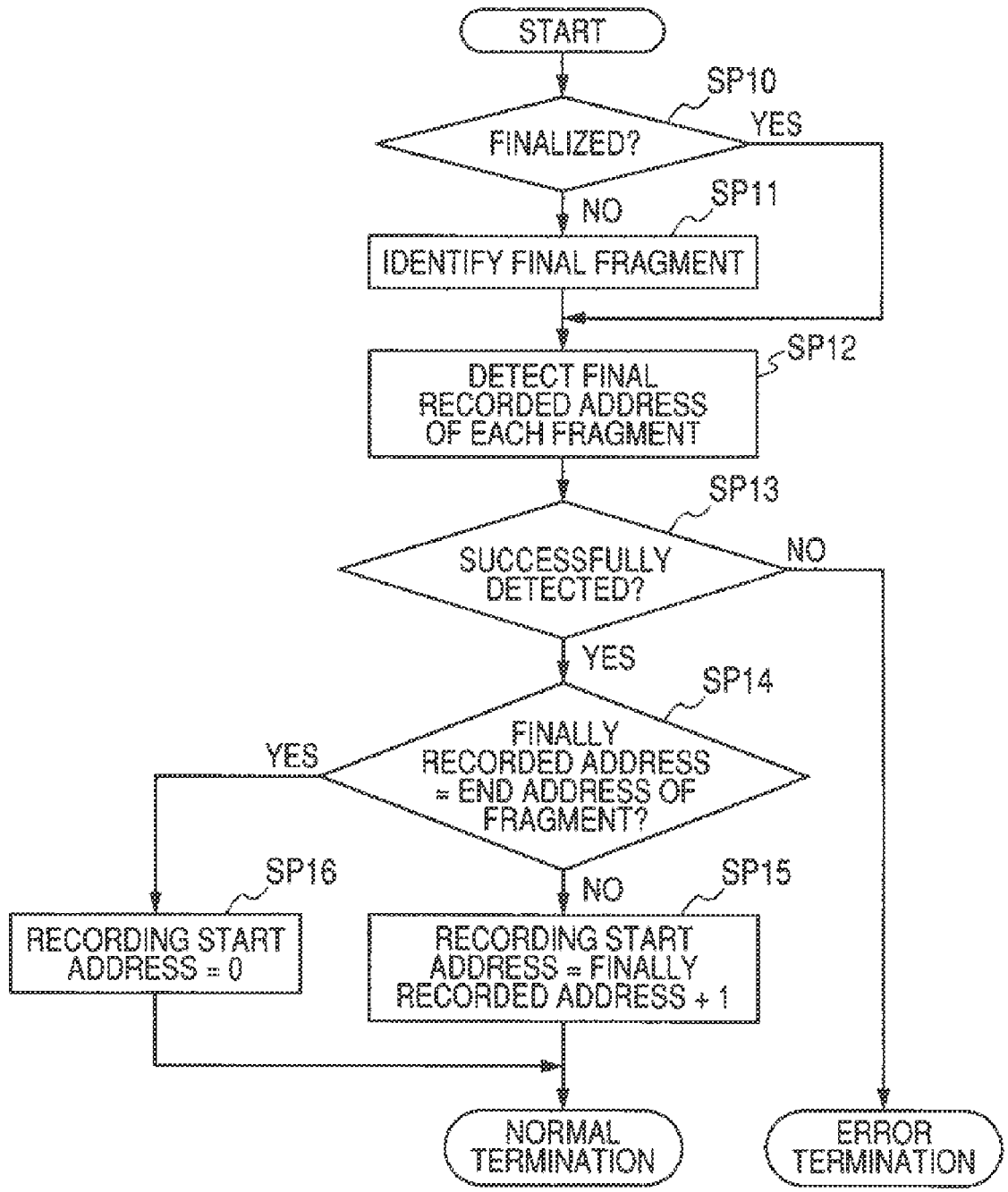
FIG. 13 is a flowchart illustrating a related-art procedure of processing for obtaining a finally recorded address.
Figure 14:
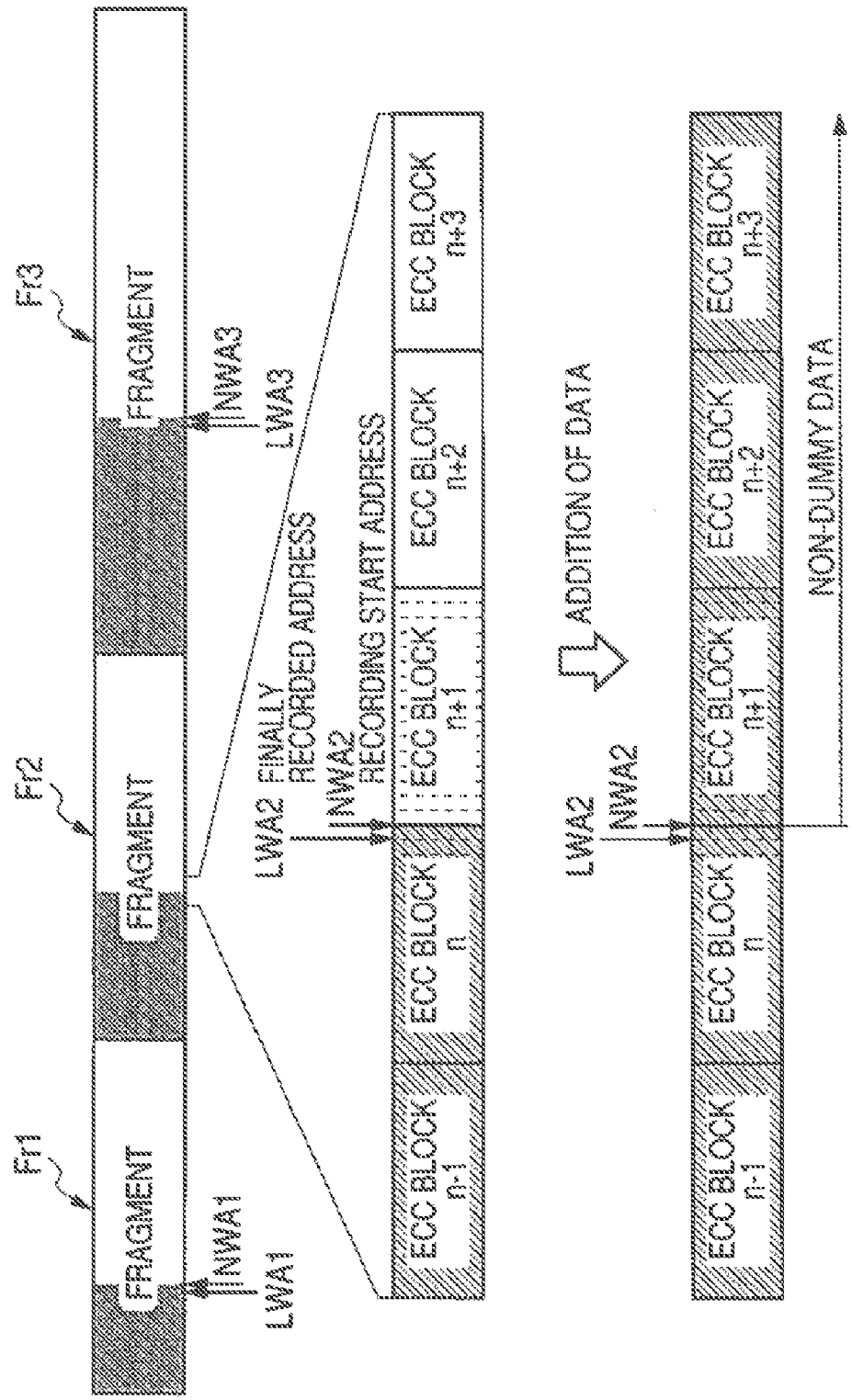
FIG. 14 is a schematic diagram used for illustration of related-art method (1) of recording data.
Figure 15:
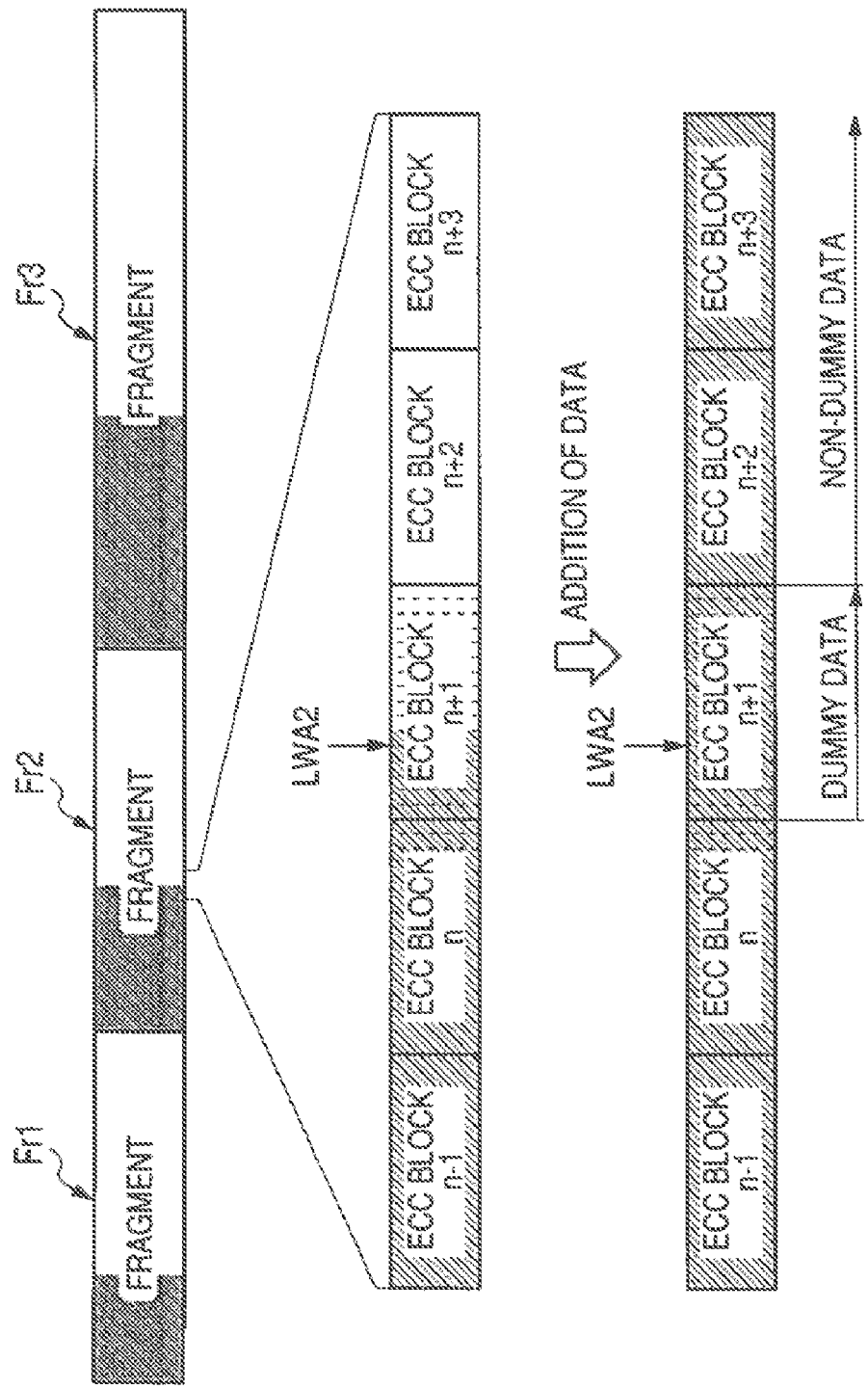
FIG. 15 is a schematic diagram used for illustration of related-art method (2) of recording data.
Figure 16:
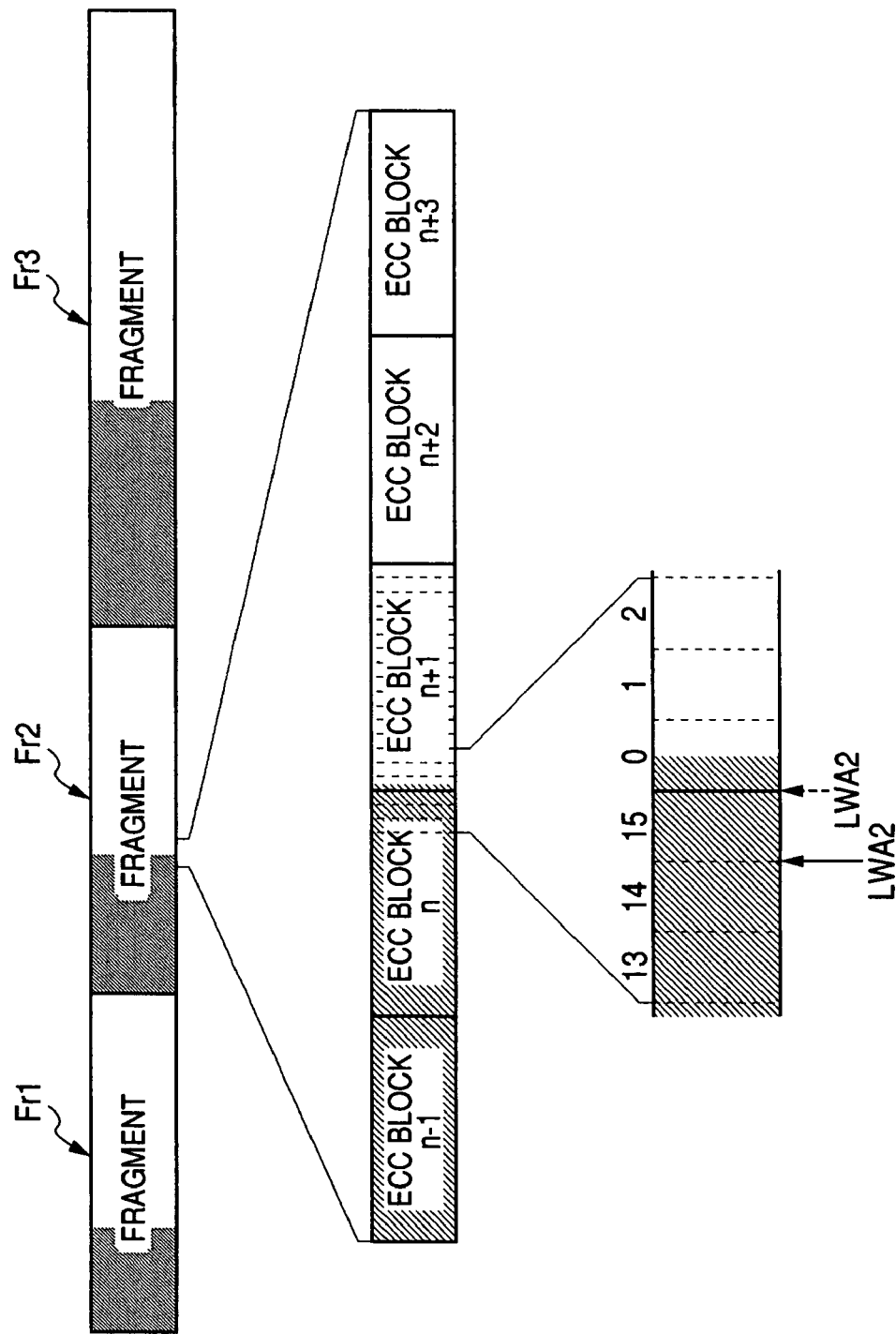
FIG. 16 is a schematic diagram used for illustration of erroneous detection of a finally recorded address, the detection being probable in a case where an RF signal is interrupted at an intermediate point in a sector.

It is now assumed that the inserted optical disc 36 is a DVD+R having a data structure as shown in FIGS. 10 and 11. That is, the disc camcorder 1 divides the recording area of the optical disc 36 into one or more sessions. Furthermore, the camcorder divides each session into plural fragments Fr (e.g., fragments Fr1, Fr2, and Fr3). Data is recorded in ECC blocks each made of plural sectors (e.g., 16 sectors, from sector 0 to sector 15). The processing for making preparations for recording and the processing for starting recording are carried out by the CPU 10 of the disc camcorder 1 according to a program read from the ROM 11.

Figure 2:
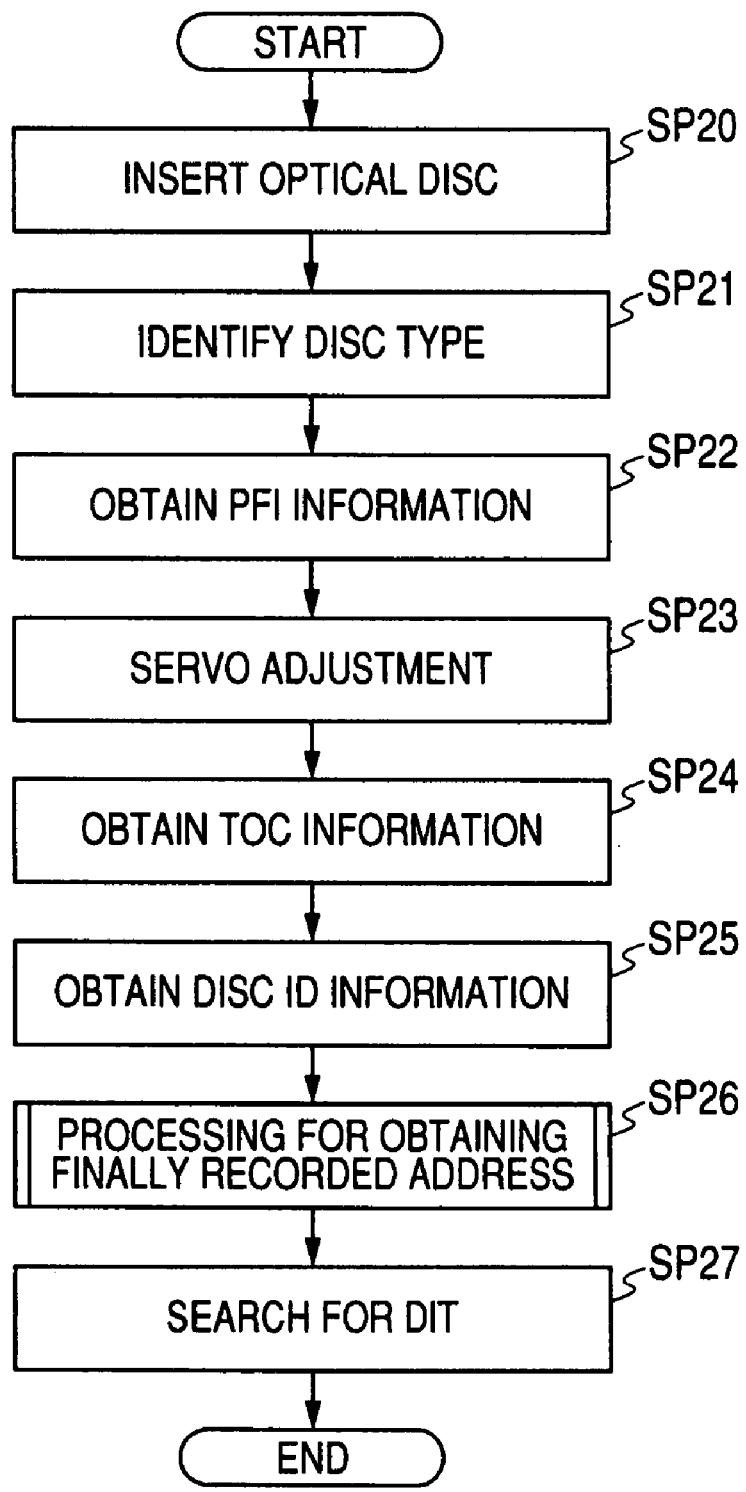
FIG. 2 is a flowchart illustrating a procedure of processing for making preparations for recording in accordance with one embodiment of the invention.

First, the procedure of processing for making preparations for recording to be executed before data is recorded on the optical disc 36 is described. As illustrated in the flowchart of FIG. 2, when the procedure RT3 of processing for making preparations for recording is started, the CPU 10 of the disc camcorder 1 goes to step SP20. In the step SP20, if insertion of the disc 36 is recognized, the CPU proceeds to the next step SP21.

In step SP21, the CPU 10 instructs the optical pickup 32 to search for the focus. As a result, the CPU obtains the amount of light reflected from the optical disc 36, detects whether there is a wobble signal via the pickup 32 and signal processing portion 33, and identifies the type of the disc 36 based on these two kinds of information. In practice, the CPU 10 discriminates between DVD-R and DVD-RW according to the magnitude of the amount of reflected light and distinguishes between DVD+ and DVD- according to whether there is a wobble signal. As a result, the CPU identifies the type of the optical disc 36. In this case, the CPU identifies the type of the disc 36 as the DVD+R and goes to the next step SP22.

In step SP22, the CPU 10 acquires PFI information from the optical disc 36 (DVD+R) via the record/playback processing portion 4. In this case, the CPU 10 first attempts to read the PFI information from the control data zone (FIG. 10) of the disc 36. If the attempt fails, the CPU attempts to read the PFI information from the ADIP and thus obtains the PFI information. If the attempt to obtain the PFI information fails, this procedure RT3 of processing for making preparations for recording is terminated with error. If the attempt to obtain the PFI information succeeds, the CPU 10 checks the result of identification at the previous step 21 based on the disc type contained in the PFI information, and goes to the next step SP23.

In step SP23, the CPU 10 controls the record/playback processing portion 4 to make a servo adjustment of the optical disc 36 based on (i) the focus direction and tracking direction relative to the optical disc 36, (ii) the offset of the tilt direction, and (iii) gain. After the servo adjustment, the CPU 10 activates the focus servo and tracking servo. In the subsequent steps SP24-SP25, TOC information is obtained from the TOC zone of the disc 36 via the record/playback processing portion 4. Disc ID information and SDCB information are derived from the disc ID zone, and then the CPU goes to the next step SP26.

Figure 3:
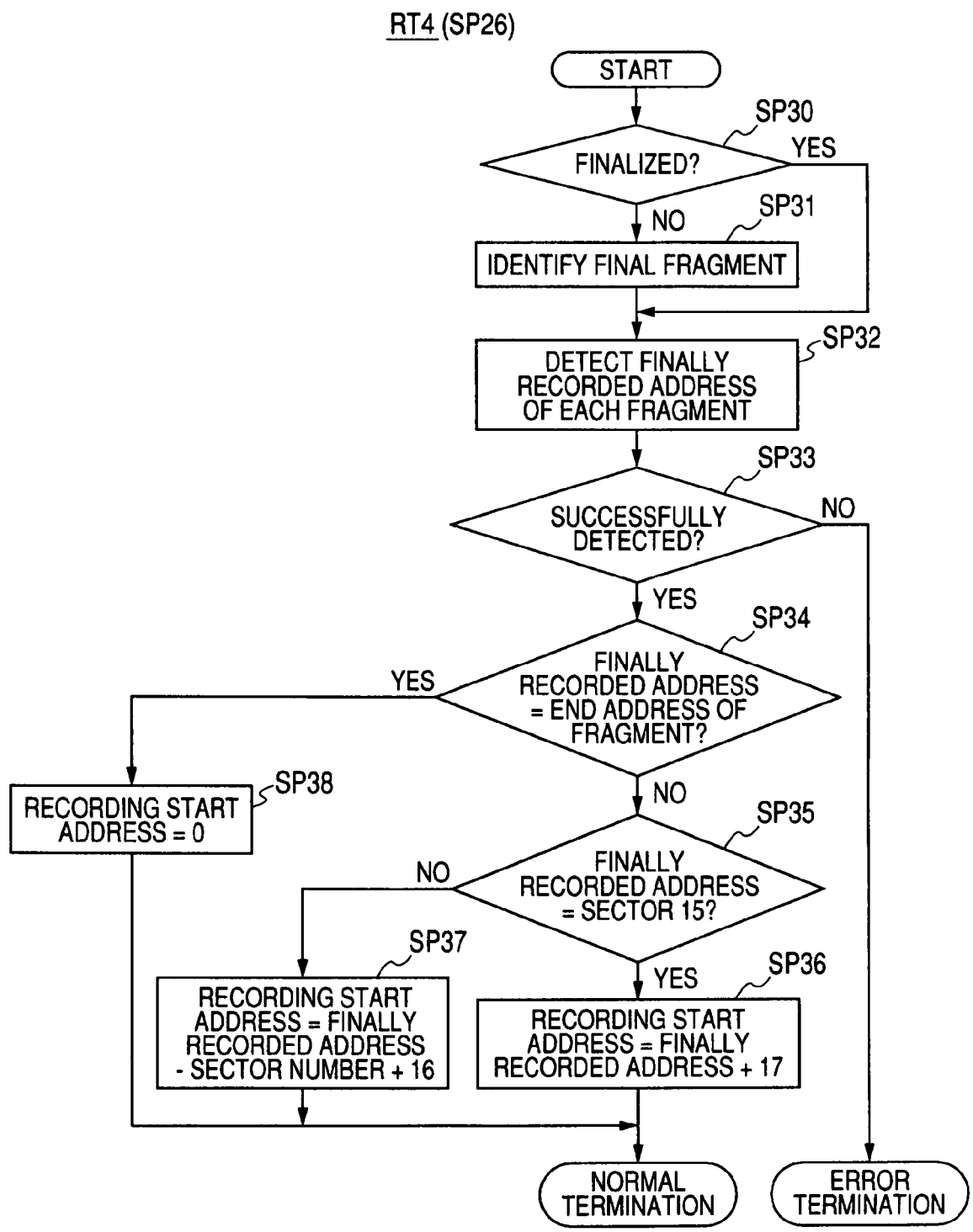
FIG. 3 is a flowchart illustrating a procedure of processing for obtaining the finally recorded address in accordance with one embodiment of the invention.

In step SP26, the CPU 10 executes processing for obtaining the finally recorded address as a subroutine, the address being necessary when additional data is recorded in multiple sessions. The procedure of processing for obtaining the finally recorded address executed in step SP26 is described with reference to the flowchart of FIG. 3. When the procedure RT4 of processing for obtaining the finally recorded address is commenced, the CPU 10 first goes to step SP30, where a decision is made as to whether the optical disc 36 has been finalized via the record/playback processing portion 4.

If the decision at the step SP30 is negative, it means that the final fragment Fr (e.g., fragment Fr3) exists behind the fragments Fr (e.g., fragments Fr1 and Fr2) shown in the SDCB information. At this time, the CPU 10 goes to step SP31, where the CPU identifies the final fragment Fr3. That is, the CPU 10 takes the address (represented in sectors, in this case) next to the final address of the rearmost fragment Fr2 recorded in the SDCB information as the start address of the final fragment Fr3, takes the finally recordable address obtained from the PFI information as the final address, identifies the final fragment Fr3, and goes to the next step SP32.

On the other hand, if the decision at the step SP30 is affirmative, it means that the inserted optical disc 36 has been finalized. That is, the start and end addresses of all the fragments Fr including the final fragment Fr3 are recorded in the SDCB information. At this time, the CPU 10 determines that it is not necessary to identify the final fragment Fr3, and goes to step SP32.

In step SP32, the CPU 10 controls the record/playback processing portion 4 and detects whether or not there is an RF signal in each sector from the start address to the end address for all the fragments Fr and thus detects the address of the rearmost sector where an RF signal is recorded as the finally recorded address LWA of each fragment Fr. Then, the CPU goes to the next step SP33. At this time, the CPU 10 uses a sector synchronization signal in detecting whether or not there is an RF signal.

In step SP33, the CPU 10 makes a decision as to whether the finally recorded address LWA has been normally detected from each segment Fr in the previous step SP32. If the decision at step SP33 is negative, it means that there is error in detecting the finally recorded address LWA. In this case, the CPU 10 terminates this procedure RT4 for processing for obtaining a finally recorded address with error. On the other hand, if the decision at the step SP33 is affirmative, the CPU 10 determines that the finally recorded address LWA has been normally detected from each fragment Fr, and proceeds to step SP34.

In step SP34, the CPU 10 makes a decision for each fragment Fr as to whether the finally recorded address LWA is the final address of the fragment Fr. If the decision at the step SP34 is negative, it means that there remains a region in the fragment Fr to which additional data can be appended. At this time, the control portion goes to step SP35.

Figure 4:
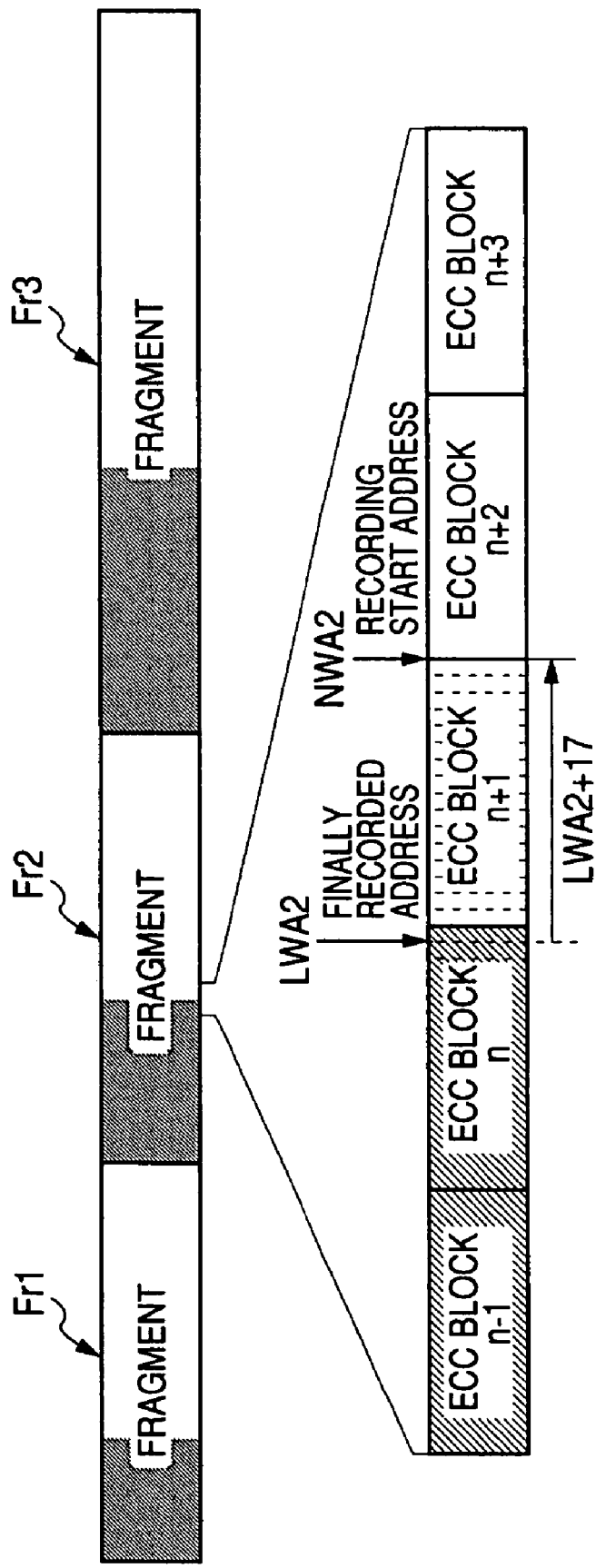
FIG. 4 is a schematic diagram used for illustration of setting of a recording start address in a case where the finally recorded address is the address of the final sector of an ECC block.

In step SP35, the CPU 10 makes a decision as to whether the finally recorded address LWA is the address of the final sector (i.e., sector 15) of the ECC block. If the decision at this step SP35 is affirmative, the CPU 10 goes to step SP36, where the recording start address NWA is set to finally recorded address LWA+17. That is, as illustrated in FIG. 4, in a case where the final recorded address LWA2 that was produced the previous time and detected, for example, from the fragment Fr2 is the address of the final sector (sector 15) of the nth ECC block, the CPU 10 sets the recording start address NWA2 to the address of the head sector (sector 0) of the (n+2)th ECC block that is the +17th sector as counted from the sector of the finally recorded address LWA2.

Figure 5:
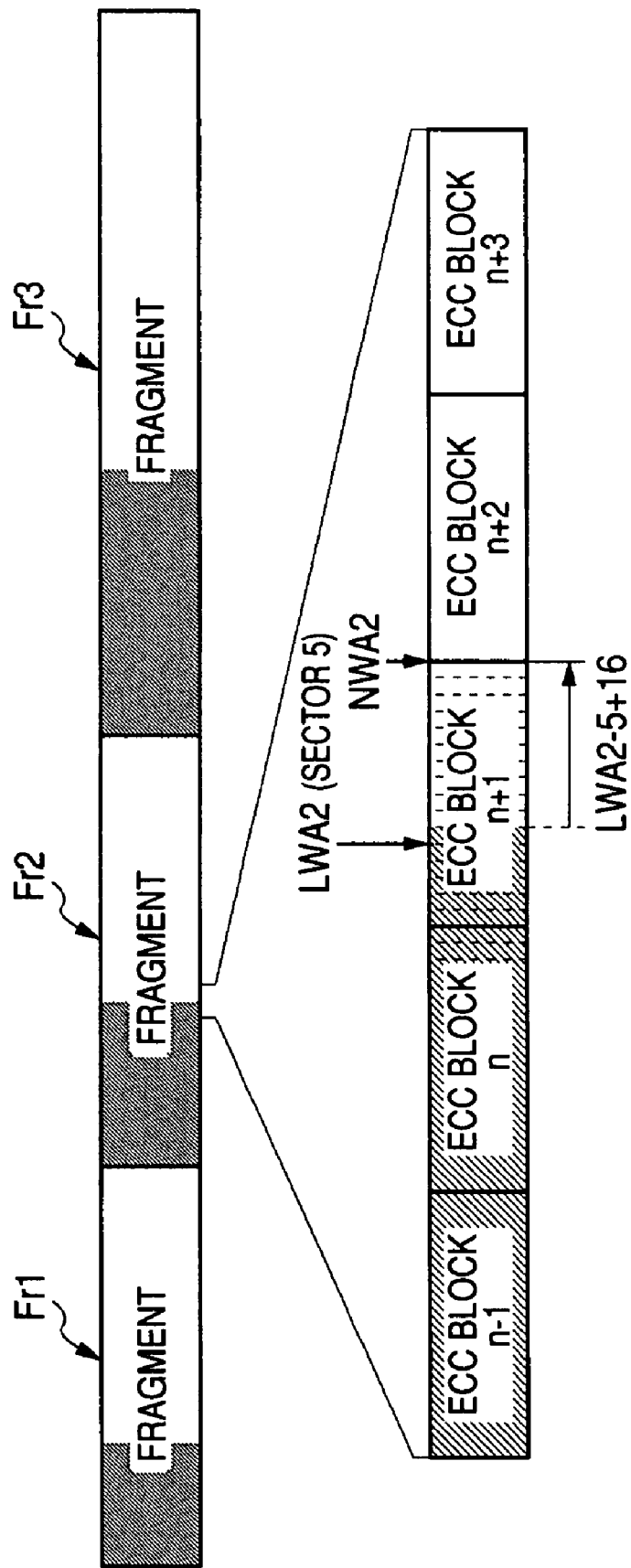
FIG. 5 is a schematic diagram used for illustration of setting of a recording start address in a case where the finally recorded address is not the address of the final sector of an ECC block.

On the other hand, if the decision at the step SP35 is negative, it means that the finally recorded address LWA is the address of an intermediate sector (i.e., from sector 0 to sector 14) in the ECC block. At this time, the CPU 10 goes to step SP37, where the CPU sets the recording start address NWA to finally recorded address LWA-sector number of the finally recorded address LWA+16. That is, as illustrated in FIG. 5, in a case where the finally recorded address LWA2 that was obtained the previous time and detected, for example, from the fragment Fr2 is the address of sector 5 of the (n+1)th ECC block, the CPU 10 sets the recording start address NWA2 to the address of the head sector of the (n+2)th ECC block that is the +16th sector as counted from the head sector of the (n+1)th ECC block including the finally recorded address LWA2.

In this way, in the disc camcorder 1, the recording start address NWA is set to the address of the head sector of the ECC block that is behind the sector indicated by the finally recorded address LWA by at least two sectors.

Meanwhile, if the decision at step SP34 is affirmative, it means that the finally recorded address LWA of the fragment Fr is the end address of the fragment Fr, i.e., no further data can be appended to the fragment Fr. At this time, the CPU 10 sets the recording start address NWA at 0 that does not exist as an address. This indicates that no further data can be appended to the fragment Fr. In this way, the recording start address NWA is set for each fragment Fr. Then, the CPU 10 terminates the procedure RT4 of processing for obtaining the finally recorded address.

After executing the processing for obtaining the finally recorded address in the step SP26 in this way, the CPU 10 goes to the next step SP27 (FIG. 2). In this step SP27, the CPU 10 searches for the disc test zone (DIT) that is used as a tentatively written region during OPC, causes the optical pickup 32 to be on standby at that location, and ends the procedure RT3 of processing for making preparations for recording.

Because of this processing for making preparations for recording, in the disc camcorder 1, preparations for recording data on the inserted optical disc 36 (DVD+R) are completed.

Figure 6:
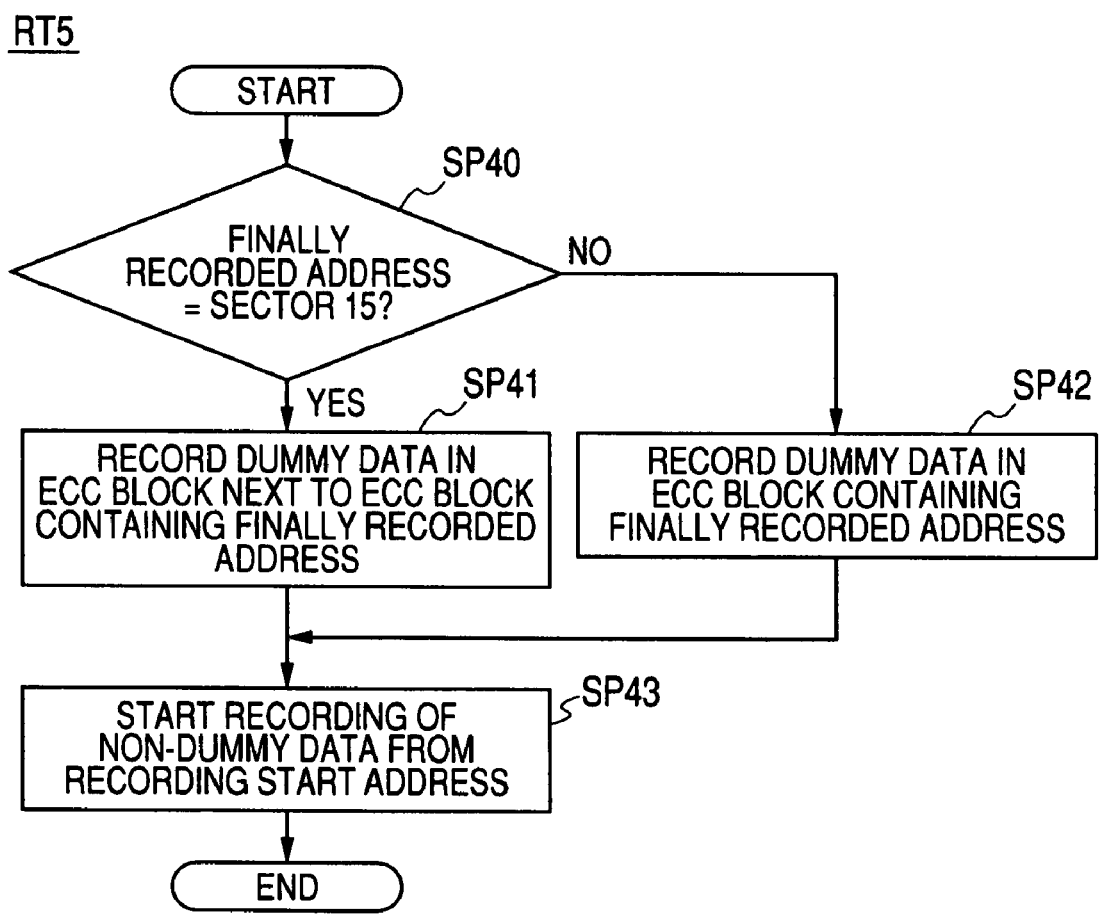
FIG. 6 is a flowchart illustrating a procedure of processing for starting recording.
Figure 7:
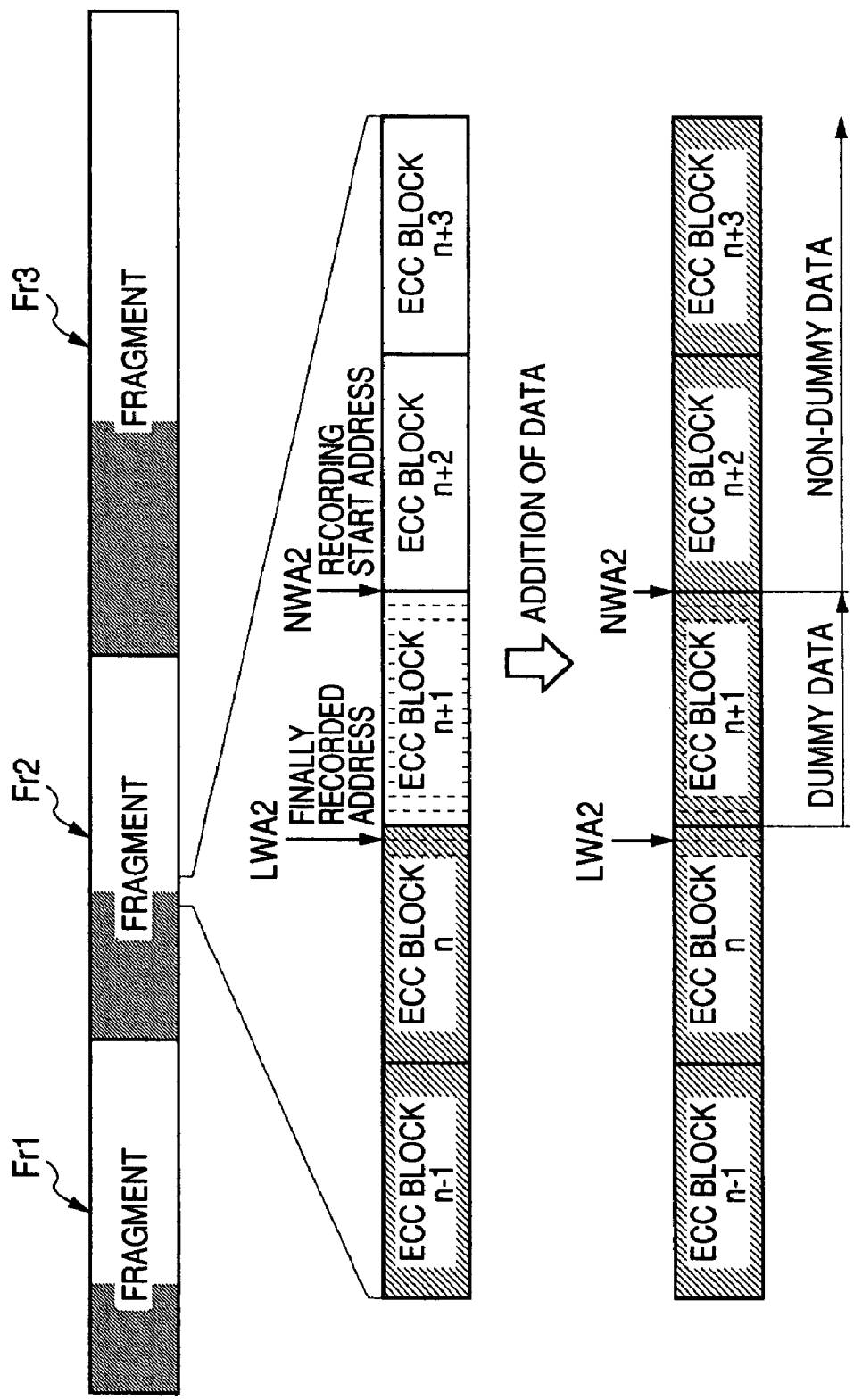
FIG. 7 is a schematic diagram used for illustration of data recording (1) according to one embodiment of the invention.

The procedure of processing for starting recording to be executed when data is started to be recorded on the optical disc 36 in practice is described now. As illustrated in the flowchart of FIG. 6, the CPU 10 goes to step SP40 when the procedure RT5 of processing for starting the recording is commenced. In the step SP40, the CPU makes a decision as to whether the finally recorded address LWA found in the processing for making preparations for recording is the address of the final sector (i.e., sector 15) of the ECC block. If the decision at this step SP40 is affirmative, the CPU 10 proceeds to step SP41, where dummy data is recorded in the ECC block next to the ECC block containing the finally recorded address LWA. That is, as illustrated in FIG. 7, in a case where the finally recorded address LWA2 detected, for example, from the fragment Fr2 is the address of the final sector (sector 15) of the nth ECC block, the CPU 10 records the dummy data in the (n+1)th ECC block.

In this way, in the disc camcorder 1, even when the finally recorded address LWA is the address of the final sector of the ECC block, dummy data corresponding to 1 ECC block is appended taking account of the error caused in detecting the finally recorded address LWA.

Figure 8:
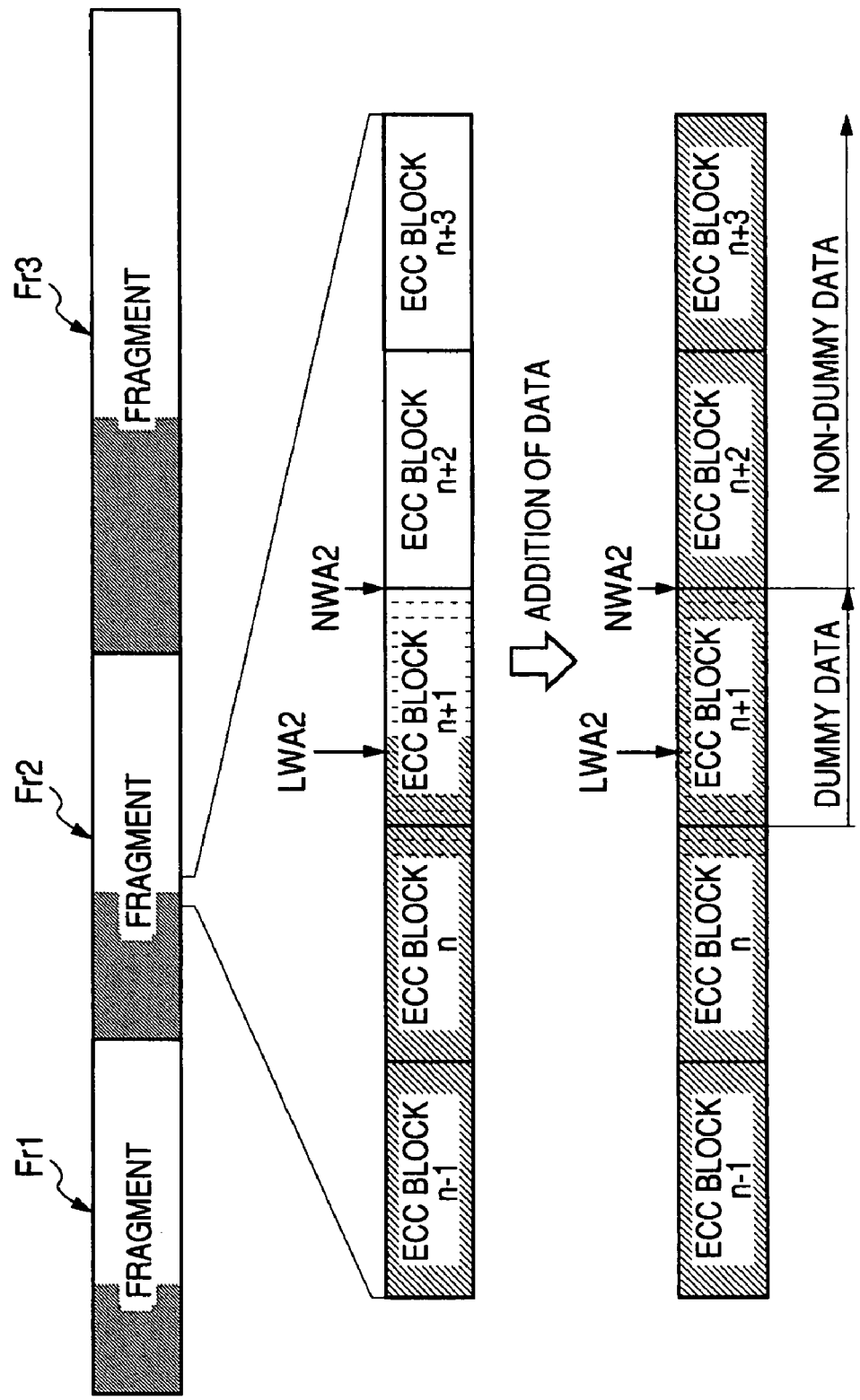
FIG. 8 is a schematic diagram used for illustration of data recording (2) according to one embodiment of the invention.

On the other hand, if the decision at step SP40 is negative, it means that the finally recorded address LWA is an intermediate sector (i.e., from sector 0 to sector 14) of the ECC block. At this time, the CPU 10 goes to step SP42, where the CPU records dummy data in the ECC block including the finally recorded address LWA. That is, as illustrated in FIG. 8, in a case where the finally recorded address LWA2 detected from the fragment Fr2 is the address of the sector 5 of the (n+1)th ECC block, for example, the CPU 10 records dummy data in this (n+1)th ECC block.

After recording the dummy data, the CPU 10 goes to step SP43, where non-dummy data (e.g., image data obtained by an imaging technique and audio data) is started to be recorded just subsequently to the dummy data from the recording start address NWA found in the processing for making preparations for recording. The procedure RT4 of processing for starting recording is ended. Incidentally, the head sector of the ECC block in which the dummy data is recorded and the address of the final sector are managed by the CPU 10 separately.

Because of the processing for starting recording as described so far, the disc camcorder 1 starts to record data on the inserted optical disc 36 (DVD+R). After ending the recording of the data, when data is read from the disc 36, the disc camcorder 1 reads the non-dummy data portion other than the dummy data.

(3) Operation and Advantages

When data is recorded on the inserted optical disc 36, the disc camcorder 1 constructed as described so far first detects whether or not there is an RF signal using a sector synchronization signal as the processing for making preparations for recording. Thus, the camcorder obtains the finally recorded address LWA from each fragment Fr. Furthermore, the camcorder 1 sets the address NWA at which non-dummy data is started to be recorded, based on the finally recorded address LWA.

If the finally recorded address LWA is the address of the final sector of the ECC block, the disc camcorder 1 sets the recording start address NWA at the finally recorded address LWA+17 (i.e., the address of the head sector of the ECC block spaced rearwardly by two sectors). On the other hand, if the finally recorded address LWA is not the address of the final sector of the ECC block, the camcorder sets the recording start address NWA to the finally recorded address LWA-sector number+16 (i.e., the address of the head sector of the next ECC block).

That is, the disc camcorder 1 sets the recording start address NWA at the address of the head sector of the ECC block located behind the sector indicated by the final recorded address LWA by at least two sectors, taking account of the error (about +−1 sector) produced in detecting the finally recorded address LWA using the sector synchronization signal.

Subsequently, if the finally recorded address LWA is the address of the final sector of the ECC block, the disc camcorder 1 records dummy data in the ECC block next to that ECC block (i.e., the processing for starting recording) and starts to record non-dummy data from the head sector (i.e., from the recording start address NWA) of the ECC block still next to the ECC block in which the dummy data is recorded. On the other hand, if the finally recorded address LWA is not the address of the final sector of the ECC block, dummy data is recorded in unrecorded sectors in this ECC block. Note that in the present embodiment, dummy data is recorded in the recorded sectors of this ECC block. Then, non-dummy data is started to be recorded from the head sector (i.e., from the recording start address NWA) of the next ECC block.

That is, the disc camcorder 1 appends dummy data to from the address next to the finally recorded address LWA to the final sector of the ECC block located behind the sector indicated by the finally recorded address LWA by at least one sector, irrespective of whether the finally recorded address LWA is the address of the final sector of the ECC block, and then starts to record non-dummy data from the head sector of the subsequent ECC block.

Figure 9:
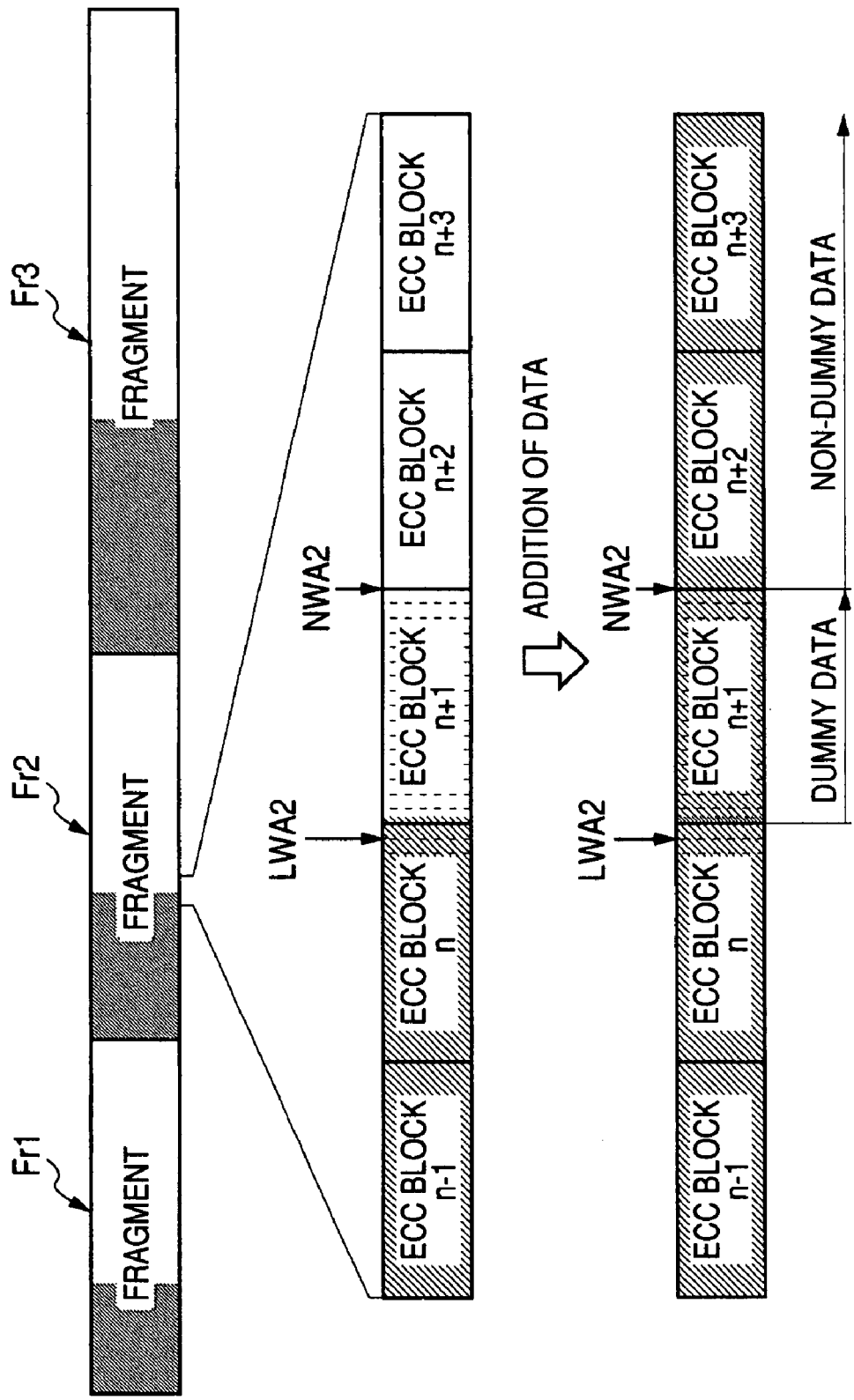
FIG. 9 is a schematic diagram used for illustration of data recording (3) according to one embodiment of the invention.

As an example, if the RF signal is interrupted during the head sector (sector 0) of the (n+1)th ECC block of the fragment Fr2 as shown in FIG. 9, the address of the head sector should be detected as the finally recorded address LWA2. Even if the address of the final sector (sector 15) of the nth ECC block immediately preceding the head sector is erroneously detected as the finally recorded address LWA2, the disc camcorder 1 appends dummy data from the address next to the finally recorded address LWA2 (i.e., the address of the head sector of the (n+1)th ECC block) to the final sector of the (n+1) th ECC block located behind the final sector of the nth ECC block indicated by the finally recorded address LWA2 by at least one sector. Then, the camcorder starts to record non-dummy data from the head sector of the following (n+2) th ECC block. Consequently, non-dummy data can be prevented from being doubly written to the head sector of the (n+1)th ECC block while strictly maintaining one stipulation for the DVD+R, i.e., data is recorded in ECC blocks. Incidentally, if dummy data is written doubly, there is no problem, because dummy data is not read out during reading.

In the structure described so far, even where an error of about 1 sector arises in detecting the finally recorded address LWA, dummy data is recorded from the address next to the finally recorded address LWA to the final sector of the ECC block located behind the sector indicated by the finally recorded address LWA by at least one region. Then, non-dummy data is started to be recorded from the head sector of the subsequent ECC block. Therefore, data is recorded strictly in each ECC block. At the same time, non-dummy data can be prevented from being written doubly. Hence, the disc camcorder 1 which can record data in such a way that the data can be reliably read during reading can be accomplished.

The disc camcorder 1 is so designed that dummy data is recorded on the assumption that there is the possibility that an error of about +−1 sector is produced in detecting the finally recorded address LWA. Therefore, it is not necessary to provide a separate detection portion for more accurately detecting the finally recorded address LWA. As a result, the aforementioned advantages can be obtained without complicating the structure.

(4) Other Embodiments

In the description of the above embodiment, the disc camcorder 1 manages sectors of the optical disc 36 by means of addresses. The invention is not limited to this method. For example, sectors may be managed using a number given to the fragment Fr, a number given to an ECC block within the fragment Fr, and a sector number within the ECC block. Sectors may be managed by various other methods of management.

Furthermore, in the description of the above embodiment, whenever data is appended to the optical disc 36, dummy data is recorded. The invention is not limited to this method. The conditions under which dummy data is recorded may be set as follows. That is, after the optical disc 36 is inserted into the disc camcorder 1 at an intermediate point in an ECC block, dummy data may be recorded only during the first recording of data. Furthermore, after the power supply for the disc camcorder 1 is turned on, dummy data may be recorded only during the first recording of data. In addition, after the power supply for the disc camcorder 1 is turned on, dummy data may be recorded during the first recording of data and during the first recording of data when another optical disc 36 is inserted in the camcorder 1. Further, when recording of data in ECC blocks on the optical disc 36 has been completed normally, information indicating the normal end may be recorded in the RAM 12 of the disc camcorder 1 and in the memory card 21. Dummy data may be recorded only provided that the information indicating the normal end is not recorded in the RAM 21 or in the memory card 21. The number of times that dummy data is recorded can be reduced while preventing double writing of data by appropriately setting the conditions under which dummy data is recorded as described previously. As a result, the storage region of the optical disc 36 can be effectively utilized. Incidentally, where no dummy data is not recorded, the disc camcorder 1 may detect the finally recorded address that was used, for example, the previous time, and may record data in ECC blocks from the address next to the finally recorded address.

Furthermore, in the description of the above embodiments, the CPU 10 (so-called the host side) of the disc camcorder 1 executes the processing for making preparations for recording and the processing for starting recording. The invention is not limited to this scheme. The record/playback control portion 28 (so-called the disc drive side) of the record/playback processing portion 4 may be made to execute all or some of the processing for making preparations for recording and the processing for starting recording.

Additionally, in the description of the above embodiments, dummy data corresponding to one ECC block is recorded. The invention is not limited to this method. Dummy data corresponding to any number of sectors may be recorded as long as the dummy data is recorded from the address next to the finally recorded address LWA to the final sector of the ECC block located behind the sector indicated by the finally recorded address LWA by at least one sector. Of course, however, as the amount of the recorded dummy data is reduced, the storage region of the optical disc 36 can be utilized more effectively.

Still further, in the description of the above embodiments, the type of the optical disc 36 is the DVD+R. The invention is not limited to use of this type of optical disc. Any optical disc may be used as long as it is a multisession disc on which data is recorded in blocks each of which is composed of plural given regions (such as sectors). The same advantages can be obtained from this type of optical disc as in the above embodiments.

Yet further, in the description of the above embodiments, the invention is applied to the disc camcorder 1. The invention is not limited to this usage. The invention can be applied to various other recorders which record data on the optical disc 36, such as optical disc drive, personal computer equipped with this optical disc drive, and DVD recorder.

Moreover, in the description of the above embodiments, the disc camcorder 1 records data on a DVD+R. The disc camcorder 1 may be designed to be able to record data on optical discs other than the DVD+R in practice. In this case, the disc camcorder 1 is made to identify the type of the disc in step SP21 of the processing for making preparations for recording and then perform processing corresponding to each individual optical disc.

Still additionally, in the description of the above embodiments, the disc camcorder 1 records dummy data when image data taken by an imaging technique and audio data are recorded on the optical disc 36. The invention is not limited to this method. Dummy data may also be recorded when various management information or data such as SDCB information and TOC information are recorded on the optical disc 36.

Yet moreover, in the description of the above embodiments, even in a case where the optical disc 36 is finalized in the processing for making preparations for recording, the disc camcorder 1 detects the finally recorded address LWA of each fragment Fr and sets the recording start address NWA. The invention is not limited to this method. Alternatively, where the optical disc 36 has been finalized, it is determined that data will not be appended subsequently. The processing for making preparations for recording may be ended without detecting the finally recorded address LWA and without setting the recording start address NWA.

Still furthermore, in the description of the above embodiments, the CPU 10 of the disc camcorder 1 executes the processing for making preparations for recording and the processing for starting recording in accordance with the program previously loaded in the ROM 11. The invention is not limited to this method. Programs for executing these kinds of processing may be loaded in a recording medium such as an optical disc, and the programs may be installed onto the ROM 11 from the recording medium.

Yet furthermore, in the description of the above embodiments, the disc camcorder 1 acting as a recording apparatus includes the detection portion, the recording control portion, and the recording portion. The detection portion is made of the recording/playback control portion 28, optical pickup 32, and signal processing portion 33. The recording control portion is made of the CPU 10. The recording portion is composed of the RAM 12 and memory card 21. The invention is not limited to this structure. The recording apparatus may also be composed of other detection portion, other recording control portion, and other recording portion as long as they have functions similar to those of the above-described portions.

The invention can be utilized in a recording apparatus for recording data on an optical disc, such as disc camcorder, optical disc drive, and DVD recorder.

It should be understood by those skilled in the art that various modifications, combinations, sub-combinations, and alterations may occur depending on design requirements and other factors insofar as they are within the scope of the appended claims or the equivalents thereof.

The invention claimed is:

1. A recording apparatus for recording data in individual blocks each made of plural given regions on an optical disc, the recording apparatus comprising:
   a detection portion which detects a finally recorded region on the optical disc by detecting for each of the given regions as to whether or not data is recorded; and
   a recording control portion which determines whether the finally recorded region detected by the detection portion is a final region of a respective block and which causes dummy data and data to be recorded in accordance with a result thereof such that (i) the recording control portion causes dummy data to be recorded in a block next to the respective block including the finally recorded region and causes data to be recorded from a head region of a block further next to the block in which the dummy data has been recorded when the finally recorded region is the final region of the respective block, and (ii) the recording control portion causes dummy data to be recorded in an unrecorded region of the respective block including the finally recorded region and causes data to be recorded from a head region of a block next to the respective block including the finally recorded region when the finally recorded region is not the final region of the respective block.

2. A recording apparatus as set forth in claim 1, wherein the optical disc is a DVD+R (digital versatile disc+recordable).

3. A recording apparatus as set forth in claim 1, wherein the recording control portion causes the dummy data to be recorded during only first recording of data after the optical disc has been inserted.

4. A recording apparatus as set forth in claim 1, wherein the recording control portion causes the dummy data to be recorded during only first recording of data after activation.

5. A recording apparatus as set forth in claim 1, wherein the recording control portion causes the dummy data to be recorded only during first recording of data after activation and during first recording of data after the optical disc has been inserted.

6. A method of recording data in blocks of an optical disc, each of the blocks being made of plural given regions, the method comprising:
   detecting a final recording region of the optical disc by detecting for each of the given regions as to whether or not there is data already recorded; and
   determining whether the detected final recorded region is a final region of a respective block and causing dummy data and data to be recorded in accordance with a result thereof such that (i) dummy data is recorded in a block next to the respective block including the final recorded region and data is recorded from a head region of a block further next to the block in which the dummy data has been recorded when the final recorded region is the final region of the respective block, and (ii) dummy data is recorded in an unrecorded region of the respective block including the final recorded region and data is recorded from a head region of a block next to the respective block including the final recorded region when the final recorded region is not the final region of the respective block.

7. A recording program for causing an information processor to perform:
   detecting, when data is recorded in blocks of an optical disc where each of the blocks is made of plural given regions, a finally recorded region of the disc by detecting for each of the given regions as to whether or not there is data already recorded; and
   determining whether the detected finally recorded region is a final region of a respective block and causing dummy data and data to be recorded in accordance with a result thereof such that (i) dummy data is recorded in a block next to the respective block including the finally recorded region and data is recorded from a head region of a block further next to the block in which the dummy data has been recorded when the finally recorded region is the final region of the respective block, and (ii) dummy data is recorded in an unrecorded region of the respective block including the finally recorded region and data is recorded from ahead region of a block next to the respective block including the finally recorded region when the finally recorded region is not the final region of the respective block.

* * * * *